United States Patent
Bickham et al.

(10) Patent No.: US 9,110,220 B2
(45) Date of Patent: Aug. 18, 2015

(54) HIGH BANDWIDTH MMF AND METHOD OF MAKING

(71) Applicant: Corning Incorporated, Corning, NY (US)

(72) Inventors: Scott Robertson Bickham, Corning, NY (US); Robert Arnold Knowlton, Wellsboro, PA (US); Kimberly Wilbert Smith, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 106 days.

(21) Appl. No.: 13/943,015

(22) Filed: Jul. 16, 2013

(65) Prior Publication Data

US 2015/0023642 A1    Jan. 22, 2015

(51) Int. Cl.
| | |
|---|---|
| G02B 6/28 | (2006.01) |
| G02B 6/028 | (2006.01) |
| C03B 37/014 | (2006.01) |
| C03C 13/04 | (2006.01) |
| C03B 37/027 | (2006.01) |

(52) U.S. Cl.
CPC ........ G02B 6/0288 (2013.01); C03B 37/01446 (2013.01); C03B 37/01453 (2013.01); C03C 13/04 (2013.01); *C03B 37/027* (2013.01); *C03B 2201/10* (2013.01); *C03B 2201/12* (2013.01); *C03B 2201/28* (2013.01); *C03B 2201/31* (2013.01); *C03B 2201/32* (2013.01); *C03B 2203/22* (2013.01); *C03B 2203/23* (2013.01); *C03B 2203/26* (2013.01)

(58) Field of Classification Search
CPC ........... G02B 6/03644; G02B 6/03627; G02B 6/0281; G02B 6/03611; G02B 6/0288
USPC .................. 385/123, 124, 125, 126, 127, 128
See application file for complete search history.

(56) References Cited

U.S. PATENT DOCUMENTS

| | | | |
|---|---|---|---|
| 7,646,955 B2 | 1/2010 | Donlagic | |
| 8,189,978 B1 | 5/2012 | Bennett et al. | |
| 2010/0040336 A1 | 2/2010 | Chen et al. | |
| 2010/0220966 A1* | 9/2010 | Bennett | 385/124 |
| 2010/0303428 A1 | 12/2010 | Bickham et al. | |
| 2013/0029038 A1 | 1/2013 | Bickham et al. | |

OTHER PUBLICATIONS

Donlagic, "Opportunities to Enhance Multimode Fiber Links by Application of Overfilled Launch," Journal of Lightwave Technology, vol. 23, No. 11, Nov. 2005.

* cited by examiner

*Primary Examiner* — Jennifer Doan
(74) *Attorney, Agent, or Firm* — Robert L. Carlson

(57) ABSTRACT

A multimode optical fiber, and a method of making the fiber, are provided according to the following steps and elements: forming a core preform with a graded refractive index that includes silica and an up-dopant; drawing the core preform into a core cane; forming an inner annular segment preform that includes silica soot and an up-dopant surrounding the core cane; and forming a depressed-index annular segment preform that includes silica soot surrounding the inner annular segment preform. The method also includes the steps: forming an outer annular segment preform that includes silica soot and an up-dopant surrounding the depressed-index annular segment preform; doping the inner, depressed-index and outer annular segment preforms simultaneously or nearly simultaneously with a down-dopant; and consolidating the segment preforms simultaneously or nearly simultaneously into inner, depressed-index and outer annular segments.

8 Claims, 4 Drawing Sheets

HIGH BANDWIDTH MMF AND METHOD OF MAKING

BACKGROUND

The present invention generally relates to optical fiber configurations and fabrication methods, and more specifically to multimode optical fiber configurations and fabrication methods.

Bend-resistant multimode fibers (MMFs) often possess a graded-index core region and a cladding region, both regions comprising silica. The cladding region can include multiple cladding segments with some segments containing up-dopant (s) and/or down-dopant(s). For example, the cladding region may include three annular segments—e.g., an inner annular segment, a down-doped, depressed-index segment and an outer annular segment. The cladding region can also include two annular segments—e.g., a depressed-index segment and an outer annular segment.

Conventional methods to fabricate the segments in the cladding region of these bend-resistant MMFs rely on silica deposition and doping steps limited to the creation of some, but not all of the segments in a given cladding region in one processing sequence. For example, an MMF having a cladding with three annular segments often will require multiple cladding deposition steps to complete the fiber. One set of processing conditions, including a silica deposition step, can be used to fabricate an inner annular segment and a depressed-index annular segment in the MMF. Another set of processing conditions, including a separate, second silica deposition step, can then be used to create the outer annular segment of the MMF. As such, fabricating bend-resistant MMFs is often a time-intensive and costly process that relies on a large number of processing steps and fiber manufacturing equipment.

Fabrication of bend-resistant MMF is also often limited by the techniques for down-doping the cladding region. It is known that extending a graded core refractive index profile into the portions of the cladding region immediately adjacent to the core can improve the peak bandwidth and bend insensitivity of the MMF. However, conventional MMF manufacturing methods and processes are not able to vary the concentration profile of down-dopants within a particular as-formed cladding segment (or segments).

SUMMARY

According to one embodiment, a multimode optical fiber is provided that includes a core having a graded refractive index. The core includes silica and an up-dopant. The multimode optical fiber also includes a cladding region surrounding the core having an inner annular segment, a depressed-index annular segment and an outer annular segment. Each segment includes silica and a down-dopant. The inner and the outer annular segments also include an up-dopant.

According to an additional embodiment, a method of making a multimode optical fiber is provided that includes the steps: forming a core preform with a graded refractive index that includes silica and an up-dopant; drawing the core preform into a core cane; and forming a depressed-index annular segment preform that includes silica soot surrounding the core cane. The method also includes the steps: forming an outer annular segment preform that includes silica soot and an up-dopant surrounding the depressed-index annular segment preform; doping the depressed-index and outer annular segment preforms with a down-dopant; and consolidating the annular segment preforms into depressed-index and outer annular segments.

According to a further embodiment, a method of making a multimode optical fiber is provided that includes the steps: forming a core preform with a graded refractive index that includes silica and an up-dopant; drawing the core preform into a core cane; forming an inner annular segment preform that includes silica soot and an up-dopant surrounding the core cane; and forming a depressed-index annular segment preform that includes silica soot surrounding the inner annular segment preform. The method also includes the steps: forming an outer annular segment preform that includes silica soot and an up-dopant surrounding the depressed-index annular segment preform; doping the inner, depressed-index and outer annular segment preforms simultaneously or nearly simultaneously with a down-dopant; and consolidating the segment preforms simultaneously or nearly simultaneously into inner, depressed-index and outer annular segments.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
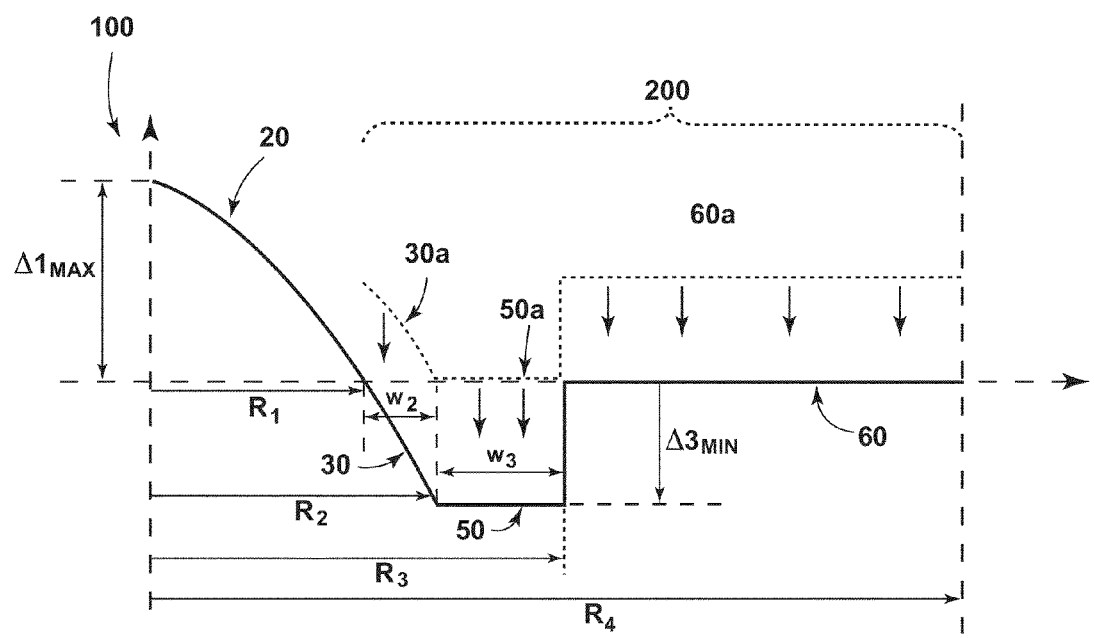
FIG. 1 shows a schematic representation (not to scale) of the refractive index profile of a MMF and an approach according to one exemplary embodiment for down-doping a cladding region such that the as-produced MMF contains a graded-index core that extends into the inner annular cladding segment and is surrounded by a depressed-index annular cladding segment and an outer annular cladding segment.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the refractive index of undoped silica glass, i.e. 1.4525 at 850 nm.

As used herein, the relative refractive index is represented by $\Delta$ and its values are given in units of "%," unless otherwise specified. In cases where the refractive index of a region is less than the reference index $n_{REF}$, the relative index percent is negative and is referred to as having a "depressed region" or "depressed index," and the minimum relative refractive index is calculated at the point at which the relative index is most negative unless otherwise specified. In cases where the refractive index of a region is greater than the reference index $n_{REF}$, the relative index percent is positive and the region can be said to be "raised" or to have a "positive index".

As also used herein, an "up-dopant" is considered to be a dopant which has a propensity to raise the refractive index relative to pure un-doped $SiO_2$. Example up-dopants that may be used according to some embodiments include $GeO_2$, $Al_2O_3$ and $P_2O_5$. A "down-dopant" is considered to be a dopant which has a propensity to lower the refractive index relative to pure un-doped $SiO_2$. Example down-dopants that may be used according to some embodiments include fluorine and boron. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

As further used herein, the terms "graded index profile," "alpha profile" and "α-profile" refer to a relative refractive index profile, expressed as $\Delta(r)$ in units of "%," where r is the radial location within the MMF, as given by Equation (1):

$$\Delta(r) = \Delta(r_o)(1 - [|r - r_o|/(r_1 - r_o)]^\alpha) \quad (1)$$

where $r_o$ is zero unless otherwise specified, $r_1$ is the point which $\Delta(r)$ has its minimum value, and r is in the range of $r_i \leq r \leq r_f$, $\Delta$ is defined as above, $r_i$ is the initial point of the α-profile, $r_f$ is the final point of the α-profile, and α is an exponent which is a positive real number.

MMFs disclosed herein comprise a core and a cladding region surrounding and directly adjacent to the core. In some embodiments, the core comprises silica doped with germanium oxide ($GeO_2$), i.e., germania-doped silica. Dopants other than germania such as alumina ($Al_2O_3$), phosphoric oxide ($P_2O_5$), singly or in combination, may be employed within the core, and particularly at or near the center-line, of the optical fiber disclosed herein to obtain the desired refractive index and density. In some embodiments, the refractive index profile of the optical fiber disclosed herein is non-negative from the center-line to the outer radius of the core. In some embodiments, the optical fiber contains no index-decreasing dopants in the core. Preferably, the core contains substantially no fluorine and, more preferably, the core contains no fluorine.

Figure 1A:
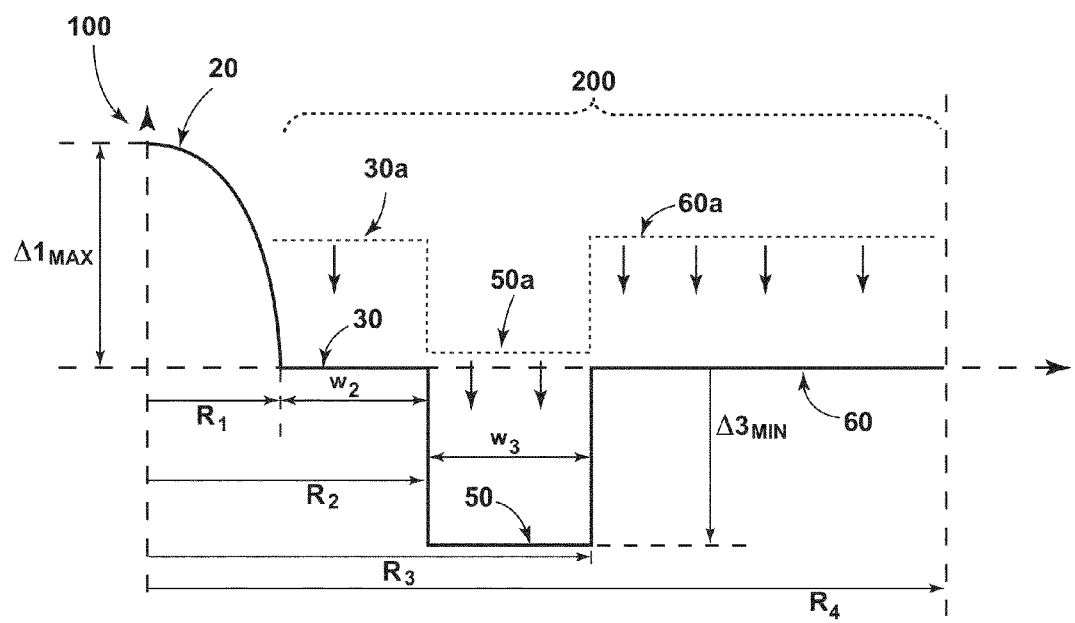
FIG. 1A shows a schematic representation (not to scale) of the refractive index profile of a MMF and an approach according to an additional exemplary embodiment for down-doping a cladding region such that the as-produced MMF contains a graded-index core with a depressed-index annular cladding segment offset from the core by an inner annular cladding segment and surrounded by an outer annular cladding segment.

FIGS. 1 and 1A provide a schematic representation of the refractive index profiles of a cross-section of the glass portion of two exemplary embodiments of a MMF 100. As shown, MMF 100 includes a core 20 having a graded refractive index profile $\Delta 1$ and radius $R_1$, surrounded by a glass cladding region 200 having an outer radius $R_4$ and an innermost radius $R_1$ coinciding with the radius of the core 20. The cladding region 200 may be surrounded by at least one coating 210 (see FIG. 1B), which may in some embodiments comprise a low modulus primary coating and a high modulus secondary coating. The coating can be a polymer coating such as an acrylate-based polymer.

Preferably, the refractive index profile $\Delta 1(r)$ of the core 20 has a parabolic or substantially parabolic shape given by alpha parameter $\alpha_1$. For example, the refractive index profile $\Delta 1(r)$ of the core may have a shape such that $\alpha_1$ is preferably between 1.9 and 2.3, more preferably about 2.1, as measured at 850 nm. In some embodiments, the refractive index profile $\Delta 1(r)$ of the core 20 may have a center-line dip, wherein the maximum refractive index of the core, $\Delta 1_{MAX}$, and the maximum refractive index of the entire MMF 100, is located a small distance away from the center-line. But in other embodiments the refractive index profile $\Delta 1(r)$ of the core 20 has no center-line dip; consequently, the maximum refractive index of the core 20, and the maximum refractive index of the entire MMF 100, are located at the center-line. The parabolic shape extends to the core radius $R_1$ and preferably extends from the center-line of MMF 100 to the core radius $R_1$.

As used herein, "parabolic" therefore includes substantially parabolically shaped refractive index profiles which may vary slightly from an $\alpha_1$ of about 2.0, for example 1.9, 2.1 or 2.3, at one or more points in the core 20, as well as profiles with minor variations and/or a center-line dip.

Figure 1B:
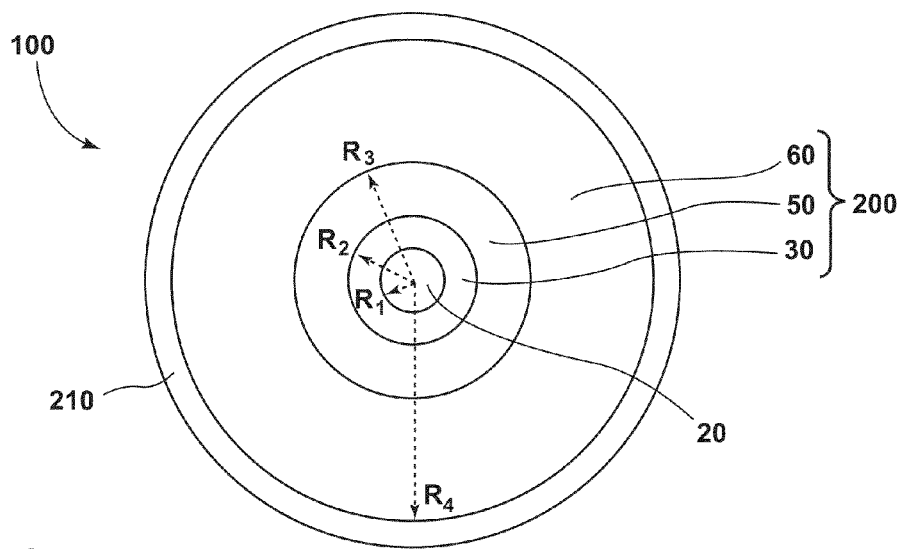
FIG. 1B is a schematic representation (not to scale) of a cross-sectional view of the as-produced MMF of FIGS. 1 and 1A.

As also depicted in FIGS. 1 and 1A, the cladding region 200 of MMF 100 that surrounds core 20 comprises an inner annular segment 30, a depressed-index annular segment 50, and an outer annular segment 60. FIG. 1B is a schematic representation (not to scale) of a cross-sectional view of the MMF 100 depicted in FIGS. 1 and 1A. As shown, the core 20 has an outer radius $R_1$ and maximum refractive index $\Delta 1_{MAX}$. The inner annular segment 30 is comprised of refractive index profile $\Delta 2(r)$, a width $w_2$ and outer radius $R_2$. Depressed-index annular segment 50 has minimum refractive index $\Delta 3_{MIN}$, width $w_3$ and outer radius $R_3$. The depressed-index annular segment 50 is shown offset, or spaced away, from the core 20 by the inner annular segment 30. In preferred embodiments, the width of inner annular segment 30 may be less than 4.0 microns.

In embodiments illustrated in FIGS. 1 and 1A, the depressed-index annular segment 50 surrounds the inner annular segment 30, and the outer annular segment 60 surrounds and contacts depressed-index annular segment 50. The inner annular portion 30 has a refractive index profile $\Delta 2(r)$ with a maximum relative refractive index $\Delta 2_{MAX}$, and a minimum relative refractive index $\Delta 2_{MIN}$, where in some embodiments $\Delta2_{MAX}=\Delta2_{MIN}$. The depressed-index annular segment 50 has a refractive index profile $\Delta3(r)$ with a minimum relative refractive index $\Delta3_{MIN}$. The outer annular segment 60 comprises relative refractive index $\Delta4(r)$. Preferably, $\Delta1>\Delta4>\Delta3$, and in the embodiments depicted in FIGS. 1 and 1A, $\Delta1>\Delta2>\Delta3$.

In some embodiments, the inner annular segment 30 of MMF 100 has a refractive index profile $\Delta2(r)$ with a graded index profile given by alpha parameter, $\alpha_2$. Preferably, $\Delta2(r)$ is parabolic or substantially parabolic in shape such that $\alpha_2$ is between 1.9 and 2.3, more preferably about 2.1, as measured at 850 nm. More preferably, an MMF 100 can be configured with a core 20 that has a graded refractive index $\Delta1(r)$ that is substantially parabolic or parabolic and the inner annular segment 30 also has a graded refractive index profile $\Delta2(r)$ that is substantially parabolic or parabolic such that $|\alpha_1-\alpha_2|<0.5$. As depicted in FIG. 1, an MMF 100 configured with parabolic or substantially parabolic-shaped refractive index profiles in the core 20 and the inner annular segment 30 effectively possesses a core region that "extends" into the inner annular segment of the cladding region. Tailoring the refractive index profiles $\Delta1(r)$ and $\Delta2(r)$ in this manner can provide increased MMF bend resistance and peak bandwidth improvements.

In other embodiments, the inner annular segment 30 has a substantially constant refractive index profile, as shown in FIG. 1A, with a constant $\Delta2(r)$; and, in some of these embodiments, $\Delta2(r)=0\%$. In some embodiments, the outer annular segment 60 has a substantially constant refractive index profile, as shown in FIGS. 1 and 1A, with a constant $\Delta4(r)$; and, in some of these embodiments, $\Delta4(r)=0\%$. In other embodiments, the inner annular segment 30 preferably has a relative refractive index profile $\Delta2(r)$ having a maximum absolute magnitude less than 0.05%, and $\Delta2_{MAX}<0.05\%$ and $\Delta2_{MIN}>-0.05\%$, and the depressed-index annular segment 50 begins where the relative refractive index of the cladding first reaches a value of less than $-0.05\%$, going radially outwardly from the center-line of MMF 100. In further embodiments, the outer annular segment 60 has a relative refractive index profile $\Delta4(r)$ having a maximum absolute magnitude less than 0.05% and greater than $-0.05\%$.

The outer diameter of the glass portion of MMF 100 is preferably less than 120 µm, more preferably less than 110 µm, even more preferably less than or equal to about 100 µm. Thus, in the embodiments illustrated in FIGS. 1 and 1A, the diameter of the outer cladding region 200 or, alternatively, outer annular segment 60 ($2\times R_4$) is preferably less than 120 µm, more preferably less than 110 µm, even more preferably less than or equal to about 100 µm. In some embodiments, the core diameter ($2\times R_1$) is between 35 and 45 µm, more preferably between 37 and 43 µm, and the outer annular segment diameter $R_4$ is between 45 and 55 µm, more preferably between 47 and 53 µm. In some preferred embodiments, the outer annular segment 60 has a width less than 15 µm, more preferably less than 10 µm, most preferably less than 7 µm.

As illustrated in FIGS. 1 and 1A, some embodiments of MMF 100 can comprise a core 20 having a graded refractive index $\Delta1(r)$ comprising silica and an up-dopant. Preferably, the up-dopant is $GeO_2$. The MMF 100 can further include a cladding region 200 surrounding the core 20 with an inner annular segment 30, depressed-index annular segment 50 and an outer annular segment 60. All segments 30, 50 and 60 comprise silica and a down-dopant, preferably fluorine. Further, in these embodiments, the inner and outer annular segments 30 and 60 comprise an up-dopant, preferably $GeO_2$. In some of these embodiments, the depressed-index annular segment 50 further includes an up-dopant, $GeO_2$, at a concentration that is substantially constant and averages $\leq 0.5$ mol %; consequently, the refractive index $\Delta3(r)$ is substantially constant. In addition, the outer annular segment 60 can include $GeO_2$ as its up-dopant, at a concentration that is substantially constant and averages $\geq 1$ mol %; consequently, the refractive index $\Delta4(r)$ is substantially constant.

In another exemplary embodiment of MMF 100, as depicted in FIG. 1, the inner annular segment 30 can include $GeO_2$ as its up-dopant, at a concentration that decreases from a maximum value $\geq 1$ mol % to a minimum value $\leq 0.5$ mol % as a function of increasing radius (e.g., within the width $w_2$, between $R_1$ and $R_2$); consequently, the refractive index $\Delta2(r)$ is graded with a profile that decreases as a function of increasing fiber radius. The depressed-index annular segment 50 can include an up-dopant, $GeO_2$, at a concentration that is substantially constant and averages $\leq 0.5$ mol %; consequently, the refractive index $\Delta3(r)$ is substantially constant. In addition, the outer annular segment 60 can include $GeO_2$ as its up-dopant, at a concentration that is substantially constant and averages $\geq 1$ mol %; consequently, the refractive index $\Delta4(r)$ is substantially constant. As also depicted in FIG. 1, the graded refractive index $\Delta1(r)$ of the core 20 in some embodiments of MMF 100 may be substantially parabolic or parabolic with an alpha parameter $\alpha_1$. Similarly, the inner annular segment 30 also can have a graded refractive index $\Delta2(r)$ with an alpha parameter $\alpha_2$. Preferably, the graded refractive index $\Delta2(r)$ of inner annular segment 30 "extends" from the graded refractive index $\Delta1(r)$ of the core 20 such that $|\alpha_1-\alpha_2|<0.5$. Accordingly, the refractive index profiles $\Delta1(r)$ and $\Delta2(r)$ will have little or no discontinuity at the interface between the core 20 and inner annular segment 30 (i.e., where the radius of MMF $100=R_1$).

In some embodiments of MMF 100, as depicted in FIG. 1A, the inner annular segment 30 can include $GeO_2$ as its up-dopant, at a concentration that is substantially constant and averages $\geq 1$ mol %; consequently, the refractive index $\Delta2(r)$ is substantially constant. The depressed-index annular segment 50 can include an up-dopant, $GeO_2$, at a concentration that is substantially constant and averages $\leq 0.5$ mol %; consequently, the refractive index $\Delta3(r)$ is substantially constant. In addition, the outer annular segment 60 can include $GeO_2$ as its up-dopant, at a concentration that is substantially constant and averages $\geq 1$ mol %; consequently, the refractive index $\Delta4(r)$ is substantially constant.

In one exemplary embodiment, the MMF 100 depicted in FIGS. 1 and 1A can be fabricated with one down-doping step. As understood by those with ordinary skill, a core preform 20a (not shown) can be prepared with a graded refractive index $\Delta1(r)$ comprising silica and an up-dopant. Preferably, the up-dopant in the core preform 20a is $GeO_2$. It also preferable to prepare core preform 20a such that the graded refractive index $\Delta1(r)$ is parabolic or substantially parabolic given by alpha parameter $\alpha_1$. More preferably, the core 20 has a $\Delta1_{MAX}$ greater than 0.8% with a graded index given by $\alpha_1$ approximately 1.9 to 2.3. In some embodiments, the core 20 has a $\Delta1_{MAX}$ between about 0.8% and about 1.2% with a graded index given by $\alpha_1$ approximately 1.9 to 2.3. In other embodiments, the core 20 has a $\Delta1_{MAX}$ between about 1.6% and about 2.2% with a graded index given by $\alpha_1$ approximately 1.9 to 2.3. The core preform 20a can then be drawn into a core cane, serving as core 20 as shown in FIGS. 1 and 1A.

The cladding region 200 of the MMF 100 that surrounds core 20 can then be fabricated, initially in the form of inner annular, depressed-index and outer annular segment preforms 30a, 50a and 60a, respectively. These annular segment preforms can be formed by silica flame-deposition or lay-down processes that deposit silica soot onto a cylindrical cane comprising core 20. In one embodiment, the cylindrical cane comprising core 20 is mounted on a lathe (e.g., a lathe nominally employed for core fabrication purposes) for the silica deposition procedure necessary to create cladding region 200. Each of these annular segment preforms can then be up-doped to form the refractive index profiles for 30a, 50a and 60a as given by the dashed lines in FIGS. 1 and 1A. Preferably, $GeO_2$ is employed as the up-dopant and can be distributed within the annular segment preforms 30a, 50a and 60a in varying concentration levels. In some of these embodiments, up-doping processes are employed to generate concentration levels of $GeO_2$ within annular segment preforms 30a, 50a and 60a comparable to those depicted in FIGS. 1 and 1A and described in connection with MMF 100 (e.g., the depressed-index annular segment preform 50a includes an up-dopant, $GeO_2$, at a concentration that is substantially constant and averages ≤0.5 mol %; consequently, the refractive index $\Delta 3(r)$ is substantially constant).

It is straightforward to control the refractive index profile $\Delta 2(r)$ within the core 20 via up-doping, it is also possible to create a well-controlled up-dopant profile in each of the annular segment preforms 30a, 50a and 60a. For example, $GeO_2$ can be doped within inner annular segment preform 30a to create a graded index that is parabolic or substantially parabolic (see FIG. 1), preferably with an alpha parameter $\alpha_2$ about 1.9 to 2.3. $GeO_2$ can also be doped within inner annular segment preform 30a to create a graded index that is substantially constant (see FIG. 1A). Still further, certain annular segments, such as depressed-index annular segment preform 50a, can be processed with little or no up-dopants resulting in a refractive index profile for the annular segment preform comparable to pure silica (see dashed line corresponding to 50a in FIGS. 1 and 1A).

Now that the annular segment preforms 30a, 50a and 60a have been up-doped with, for example, $GeO_2$, they can be subjected to a simultaneous, or near-simultaneous, down-doping and consolidation process to form the annular segments 30, 50 and 60 of cladding region 200. As the silica soot making up the annular segment preforms 30a, 50a and 60a has not been consolidated, it contains a substantial degree of porosity and interstices, facilitating control of the down-dopant concentration in each annular segment of the preform. As illustrated by the down-ward arrows in FIGS. 1 and 1A, the refractive index profiles $\Delta 2(r), \Delta 3(r)$ and $\Delta 4(r)$ in annular segment preforms 30a, 50a and 60 are uniformly reduced by down-doping. Preferably, the down-doping step is performed using a fluorine down-dopant, e.g., by employing $SiF_4$ gas as a precursor. As is generally understood by those with ordinary skill, the down-dopant is introduced into the annular segment preforms 30a, 50a and 60a at a substantially constant or constant concentration as it is difficult to accurately create down-dopant concentration profiles within particular annular cladding segments in a MMF that vary in composition throughout the thickness of the segments. During the down-doping process, typically at elevated temperatures, annular segment preforms 30a, 50a and 60a are also consolidated or sintered to form annular segments 30, 50 and 60. In effect, the refractive index profiles $\Delta 2(r), \Delta 3(r)$ and $\Delta 4(r)$ in each of the annular segments 30, 50 and 60 are largely controlled or configured by the up-doping steps during formation of their respective preforms (i.e., preforms 30a, 50a and 60s).

By relying on the up-doping process step to vary the radial concentration of up-dopants within each annular segment (e.g., as compared to down-doping processes with less precise dopant concentration profile control), it is possible to better tailor the refractive index profiles of each annular segment within the cladding region 200 of MMF 100 as depicted in FIGS. 1 and 1A. In addition, these MMF process exemplary embodiments are advantageous in the sense that they require fewer processing steps compared to conventional preform fabrication methods. As noted above, the annular segment preforms 30a, 50a and 60a are deposited on the core 20 in essentially two steps, comprising up-doping in a deposition step, and down-doping and consolidating in a second and final step. This approach saves MMF processing time and improves manufacturing yield as each annular segment preform (e.g., inner annular segment 30) is not required to be separately deposited, doped and then consolidated before the creation of the next, successive annular segment (e.g., depressed-index annular segment 50).

Figure 1C:
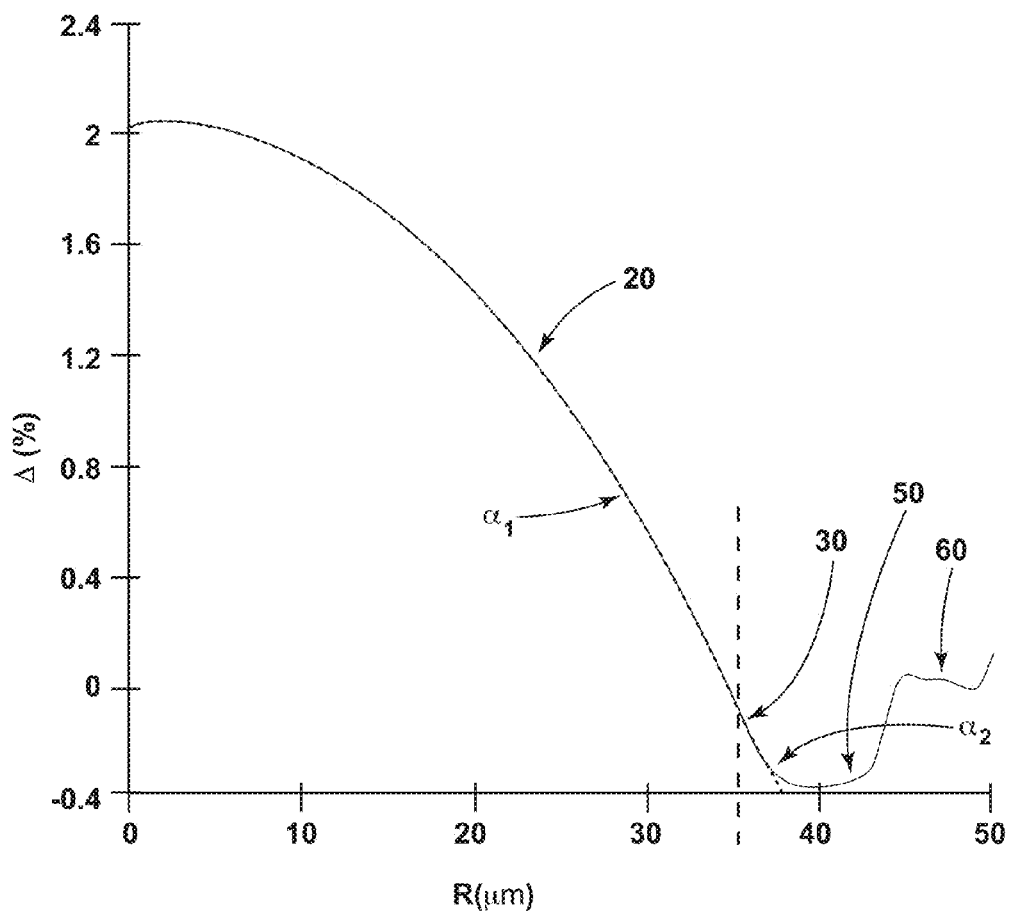
FIG. 1C is the measured refractive index profile of a MMF processed with a cladding down-doping process according to another exemplary embodiment such that the MMF contains a graded-index core that extends into the inner annular cladding segment and is surrounded by a depressed-index annular cladding segment and an outer annular cladding segment.

As illustrated by FIG. 1C, an exemplary embodiment of MMF 100 was prepared according to FIG. 1. The core 20 was derived from a core preform 20a, possessing a refractive index profile $\Delta 1(r)$ with a substantially parabolic shape given by $\alpha_1$ in the range of about 1.9 to 2.3. Inner annular segment preform 30a, depressed-index annular segment preform 50a and outer annular segment preform 60a were formed from silica soot surrounding core 20 (not shown), and up-doped with $GeO_2$. These preforms were then down-doped with fluorine and consolidated to form inner annular, depressed-index and outer annular segments 30, 50 and 60. As shown, inner annular segment 30 possesses a refractive index profile $\Delta 2(r)$ with a substantially parabolic shape given by $\alpha_2$ in the range of about 1.9 to 2.3. In particular, the refractive index profile $\Delta 2(r)$ in the inner annular segment 30 was processed successfully to "extend" from $\Delta 1(r)$ such that $|\alpha_1 - \alpha_2| < 0.5$.

Figure 2:
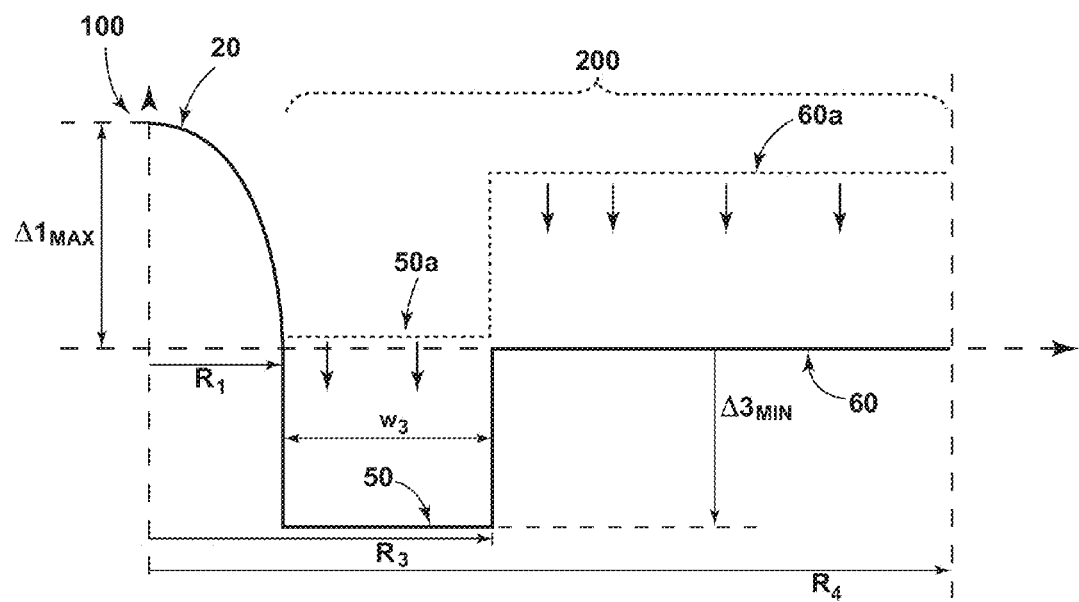
FIG. 2 shows a schematic representation (not to scale) of the refractive index profile of a MMF and an approach according to another exemplary embodiment for down-doping a cladding region such that the as-produced MMF contains a graded-index core with a depressed-index annular segment that is not offset from the core and is surrounded by an outer annular segment.
Figure 2A:
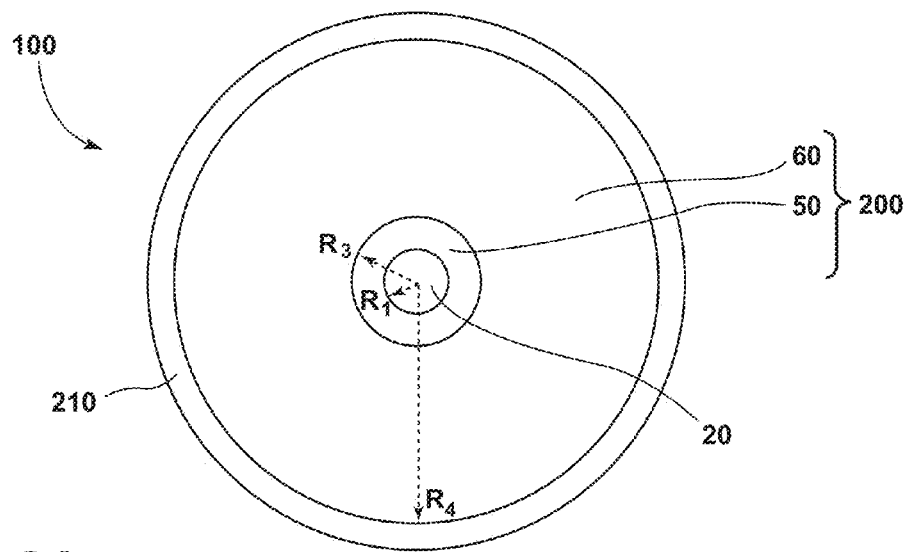
FIG. 2A is a schematic representation (not to scale) of a cross-sectional view of the as-produced MMF of FIG. 2.

In some other embodiments of MMF 100, as depicted in FIG. 2, the cladding region 200 surrounding core 20 comprises two annular segments—depressed-index annular segment 50 and outer annular segment 60. These embodiments of MMF 100 differ from those shown in FIGS. 1 and 1A insofar as the MMF 100 shown in FIG. 2 lacks an inner annular segment 30. FIG. 2A is a schematic representation (not to scale) of a cross-sectional view of the MMF 100 depicted in FIG. 2. That is, the core 20 has an outer radius $R_1$ and maximum refractive index $\Delta 1_{MAX}$. Core 20 may possess a graded index, preferably parabolic or substantially parabolic, as given by $\alpha_1$. Typically, the core 20 can be prepared in these embodiments of MMF 100 as also described earlier in connection with the embodiments depicted in FIGS. 1 and 1A.

As also depicted in FIGS. 2 and 2A, the depressed-index annular segment 50 in cladding region 200 has a refractive index profile $\Delta 3(r)$ with a minimum refractive index $\Delta 3_{MIN}$, width $w_3$ and outer radius $R_3$. Further, the outer annular segment 60 in cladding region 200 has a refractive index $\Delta 4(r)$ with a maximum refractive index $\Delta 4_{MAX}$, a minimum refractive index $\Delta 4_{MIN}$, and outer radius $R_4$, where in some embodiments $\Delta 4_{MAX} = \Delta 4_{MIN}$. In these embodiments, depressed-index annular segment 50 surrounds and is in direct contact with the core 20, i.e., there is no inner annular segment 30 (having $\Delta 2(r)$) between the core 20 and the depressed-index annular segment 50. Preferably, $\Delta 1 > \Delta 4 > \Delta 3$. It is also preferable to configure MMF 100 such that $\Delta 1_{MAX} > \Delta 3_{MIN}$.

In some of the embodiments of MMF 100 depicted in FIGS. 2 and 2A, it is preferable for core 20 to be doped with $GeO_2$ and contain substantially no fluorine. More preferably, core 20 contains no fluorine. Is some of these embodiments, the depressed-index annular segment 50 begins where the relative refractive index of the cladding region 200 first reaches a value of −0.05% going radially outwardly from the center-line of MMF 100, thus beginning refractive index profile $\Delta 3(r)$. In other embodiments, the outer annular segment 60 has a relative refractive index profile $\Delta 4(r)$ having a maximum absolute magnitude less than 0.05%, and $\Delta 4_{MAX}<0.05\%$ and $\Delta 4_{MIN}>-0.05\%$, and the depressed-index annular segment 50 ends where the region of relatively constant refractive index $\Delta 4(r)$ begins.

In another exemplary embodiment, the MMF 100 depicted in FIGS. 2 and 2A can be fabricated with one down-doping step. As understood by those with ordinary skill, a core preform 20a (not shown) can be prepared with a graded refractive index $\Delta 1(r)$ comprising silica and an up-dopant. Preferably, the up-dopant in the core preform 20a is $GeO_2$. It also preferable to prepare core preform 20a such that the graded refractive index $\Delta 1(r)$ is parabolic or substantially parabolic given by alpha parameter $\alpha_1$. More preferably, the core 20 has a $\Delta 1_{MAX}$ greater than 0.8% with a graded index given by $\alpha_1$ approximately 1.9 to 2.3. In some embodiments, the core 20 has a $\Delta 1_{MAX}$ between about 0.8% and about 1.2% with a graded index given by $\alpha_1$ approximately 1.9 to 2.3. In other embodiments, the core 20 has a $\Delta 1_{MAX}$ between about 1.6% and about 2.2% with a graded index given by $\alpha_1$ approximately 1.9 to 2.3. The core preform 20a can then be drawn into a core cane, serving as core 20 as shown in FIGS. 2 and 2A.

The cladding region 200 of the MMF 100 that surrounds core 20 can then be fabricated, initially in the form of depressed-index and outer annular segment preforms 50a and 60a, respectively. These annular segment preforms can be formed by silica flame-deposition or lay-down processes that deposit silica soot onto the core 20. In one embodiment, core 20 is mounted on a lathe for the silica deposition procedure necessary to create cladding region 200. Each of these annular segment preforms can then be up-doped to form the refractive index profiles for 50a and 60a as given by the dashed lines in FIGS. 2 and 2A. Preferably, $GeO_2$ is employed as the up-dopant and can be distributed within the annular segment preforms 50a and 60a in varying concentration levels. In some of these embodiments, up-doping processes are employed to generate concentration levels of $GeO_2$ within annular segment preforms 50a and 60a comparable to those depicted in FIGS. 2 and 2A and described in connection with MMF 100 (e.g., the depressed-index annular segment preform 50a includes an up-dopant, $GeO_2$, at a concentration that is substantially constant and averages ≤0.5 mol %; consequently, the refractive index $\Delta 3(r)$ is substantially constant). It is possible to create a well-controlled up-dopant profile in each of the annular segment preforms 50a and 60a. Still further, certain annular segments, such as depressed-index annular segment preform 50a, can be processed with little or no up-dopants resulting in a refractive index profile for the annular segment preform comparable to pure silica (see dashed line 50a in FIGS. 2 and 2A).

Now that the annular segment preforms 50a and 60a have been up-doped with, for example, $GeO_2$, they can be down-doped and consolidated to form the annular segments 50 and 60 of cladding region 200. As the silica soot making up the annular segment preforms 50a and 60a has not been consolidated, it contains a substantial degree of porosity and interstices, facilitating control of the down-dopant concentration in each annular segment of the preform. As illustrated by the downward arrows in FIGS. 2 and 2A, the refractive index profiles $\Delta 3(r)$ and $\Delta 4(r)$ in annular segment preforms 50a and 60a are uniformly reduced by down-doping. Preferably, the down-doping step is performed using a fluorine down-dopant, e.g., by employing $SiF_4$ gas as a precursor. As is generally understood by those with ordinary skill, the down-dopant is introduced into the annular segment preforms 50a and 60a at a substantially constant or constant concentration as it is difficult to accurately create down-dopant concentration profiles within particular annular cladding segments in a MMF that vary in composition throughout the thickness of the segments. Next, annular segment preforms 50a and 60a can be consolidated or sintered in a separate step to form annular segments 50 and 60. It should also be understood that the prior-described configurations of MMF 100 depicted in FIGS. 1 and 1A can likewise be prepared using a sequence of separate down-doping and consolidation steps for the cladding region 200.

Preferably, however, the down-doping step is conducted simultaneously or nearly simultaneously with the consolidation step as both steps are typically performed at elevated temperatures. For example, it is possible to down-dope with a $SiF_4$ precursor at an elevated temperature while, at roughly the same time, consolidating preforms 50a and 60a. Independent of the down-doping and consolidation step sequencing (e.g., simultaneous, near-simultaneous or in step-wise sequence), the refractive index profiles $\Delta 3(r)$ and $\Delta 4(r)$ in each of the annular segments 50 and 60 are largely controlled or configured by the up-doping steps during formation of their respective preforms (i.e., preforms 50a and 60a).

By relying on the up-doping process step to vary the concentration of up-dopants within each annular segment, it is possible to better tailor the refractive index profiles of each annular segment within the cladding region 200 of MMF 100 as depicted in FIGS. 2 and 2A. In addition, these exemplary process embodiments to create MMF 100 are advantageous in the sense that they require fewer steps compared to conventional preform fabrication methods. As noted above, the annular segment preforms 50a and 60a are deposited on the core 20 in essentially three steps, comprising up-doping in one step, down-doping in a second step, and consolidating in a third and final step. It is also possible to conduct the down-doping and consolidation in one simultaneous or nearly simultaneous step. Ultimately, these approaches save MMF processing time and improve manufacturing yield as each annular segment preform (e.g., depressed-index annular segment 50) is not required to be separately deposited, doped and then consolidated before the creation of the next, successive annular segment (e.g., outer annular segment 60).

The fabrication and processing of two MMFs, Example 1 according to one exemplary embodiment and Comparative Example 1, are described as follows. Example 1 is comparable to MMF 100 depicted in FIG. 1, prepared with a single down-doping and consolidation step for the cladding region 200. Comparative Example 1 possesses a final refractive index profile comparable to MMF 100 from Example 1, but was processed with conventional means with multiple cladding deposition down-doping and consolidation steps.

EXAMPLE 1

A total of 1074 g (0.36 g/cc density) of $SiO_2$ soot was flame deposited onto a 1 m long×26 mm diameter solid glass cane comprising a $GeO_2$—$SiO_2$ graded index core (1.9% maximum refractive index relative to pure silica with a parabolic shape ($\alpha_1$=2.1)). The soot comprised three segments: a first segment doped with $GeO_2$ to a maximum relative refractive index of 0.17% and decreasing to a minimum relative refractive index of 0%, a second segment comprising essentially pure $SiO_2$, and a third segment doped with $GeO_2$ to a constant relative refractive index of 0.35%. This assembly was then sintered as follows. The assembly was first dried for 2 hours in an atmosphere consisting of helium and 3% chlorine at 1125° C. The soot preform was then doped with fluorine in an atmosphere consisting of helium and 16% $SiF_4$ at 1125° C. for 4 hours. This was followed by down driving at 14 mm/min through a hot zone set at 1480° C. in a 100% helium atmosphere in order to sinter the soot to an over-clad preform comprising a $GeO_2$—$SiO_2$ graded index core, a first annular segment comprising $SiO_2$ doped with $GeO_2$ and fluorine, a second depressed annular segment comprising $SiO_2$ doped with fluorine and a third annular segment comprising $SiO_2$ doped with $GeO_2$ and fluorine. The preform was placed for 24 hours in an argon-purged holding oven set at 1000° C. The preform was drawn to an 70 km length of 100 μm diameter fiber at 10 m/s using a draw furnace having a hot zone of about 8 cm length and set at approximately 2000° C.

COMPARATIVE EXAMPLE 1

275 g of $SiO_2$ (0.36 g/cc density) soot was flame deposited onto a 1 m long×26 mm diameter solid glass cane comprising a $GeO_2$—$SiO_2$ graded index core (1.9% maximum refractive index relative to pure silica with a parabolic shape ($\alpha_1$=2.1)). This assembly was then sintered as follows. The assembly was first dried for 2 hours in an atmosphere consisting of helium and 3% chlorine at 1125° C. followed by fluorine doping the soot preform in an atmosphere consisting of helium and 20% $SiF_4$ at 1125° C. for 4 hours. This was followed by down driving at 14 mm/min through a hot zone set at 1480° C. in a 100% helium atmosphere in order to sinter the soot to an over-clad preform comprising a $GeO_2$—$SiO_2$ graded index core and a fluorine-doped cladding layer. The preform was then placed on a lathe where 825 g of $SiO_2$ soot were flame deposited. This assembly was then sintered as follows. The assembly was first dried for 2 hours in an atmosphere consisting of helium and 3% chlorine at 1000° C., followed by down driving at 6 mm/min through a hot zone set at 1500° C. in a 100% helium atmosphere, in order to sinter the soot to an optical preform comprising a $GeO_2$—$SiO_2$ graded index core, a fluorine-doped depressed cladding layer and an outer cladding comprising essentially pure $SiO_2$. The preform was placed for 24 hours in an argon-purged holding oven set at 1000° C. The preform was drawn to an 50 km length of 100 μm diameter fiber at 10 m/s using a draw furnace having a hot zone of about 8 cm length and set at approximately 2000° C.

It will be apparent to those skilled in the art that various modifications and variations can be made without departing from the spirit or scope of the claims.

What is claimed is:

1. A multimode optical fiber, comprising:
    a core having a graded refractive index, the core comprising silica and an up-dopant; and
    a cladding region surrounding the core having an inner annular segment, a depressed-index annular segment and an outer annular segment, each segment comprising silica and a down-dopant,
    wherein the inner and the outer annular segments further comprise an up-dopant.

2. The multimode optical fiber according to claim 1, wherein the up-dopant is $GeO_2$ and the down-dopant is fluorine.

3. The multimode optical fiber according to claim 1, wherein the core has a graded refractive index that is substantially parabolic or parabolic with an alpha parameter $\alpha_1$ and the inner annular segment has a refractive index that is substantially parabolic or parabolic with an alpha parameter $\alpha_2$ such that $|\alpha_1 - \alpha_2| < 0.5$.

4. The multimode optical fiber according to claim 1, wherein:
    (a) the depressed-index annular segment further comprises $GeO_2$ with a concentration that is substantially constant and averages ≤0.5 mol %; and
    (b) the up-dopant in the outer annular segment is $GeO_2$ with a concentration that is substantially constant and averages ≥1 mol %.

5. The multimode optical fiber according to claim 1, wherein:
    (a) the up-dopant in the inner annular segment is $GeO_2$ with a concentration that is substantially constant and averages ≥1 mol %;
    (b) the depressed-index annular segment further comprises $GeO_2$ with a concentration that is substantially constant and averages ≤0.5 mol %; and
    (c) the up-dopant in the outer annular segment is $GeO_2$ with a concentration that is substantially constant and averages ≥1 mol %.

6. The multimode optical fiber according to claim 1, wherein:
    (a) the up-dopant in the inner annular segment is $GeO_2$ with a concentration that decreases from a maximum value ≥1 mol % to a minimum value ≤0.5 mol % as a function of increasing radius;
    (b) the depressed-index annular segment further comprises $GeO_2$ with a concentration that is substantially constant and averages ≤0.5 mol %; and
    (c) the up-dopant in the outer annular segment is $GeO_2$ with a concentration that is substantially constant and averages ≥1 mol %.

7. The multimode optical fiber according to claim 5, wherein the down-dopant is fluorine.

8. The multimode optical fiber according to claim 6, wherein the down-dopant is fluorine.

* * * * *